United States Patent
Jadhav et al.

(10) Patent No.: US 12,543,642 B2
(45) Date of Patent: Feb. 10, 2026

(54) AUTOMATED POWERED LADDER

(71) Applicant: DEERE & COMPANY, Moline, IL (US)

(72) Inventors: Snehalrao S. Jadhav, Satara (IN); Aaron S. Ritter, Milan, IL (US); Paul D. Marvin, DeWitt, IA (US); Blake A. Boe, Colona, IL (US); Alex R. Vandegrift, Cuba City, WI (US); Corey A. Akers, Highlands Ranch, CO (US)

(73) Assignee: Deere & Company, Moline, IL (US)

( * ) Notice: Subject to any disclaimer, the term of this patent is extended or adjusted under 35 U.S.C. 154(b) by 482 days.

(21) Appl. No.: 18/309,052

(22) Filed: Apr. 28, 2023

(65) Prior Publication Data
US 2024/0357962 A1    Oct. 31, 2024

(51) Int. Cl.
*A01D 41/12* (2006.01)
*B60R 3/02* (2006.01)

(52) U.S. Cl.
CPC ............ *A01D 41/1261* (2013.01); *B60R 3/02* (2013.01)

(58) Field of Classification Search
CPC ....... A01D 41/1261; A01D 75/20; B60R 3/02
See application file for complete search history.

(56) References Cited

U.S. PATENT DOCUMENTS

| | | | |
|---|---|---|---|
| 4,739,610 A | 4/1988 | Schultz | |
| 6,971,225 B1 | 12/2005 | Kempf et al. | |
| 8,002,298 B2 * | 8/2011 | Casbolt | B60R 3/02 280/169 |
| 9,994,159 B2 * | 6/2018 | Giesmann | E06C 5/24 |
| 2016/0101739 A1 * | 4/2016 | Edelen | A01D 75/20 280/164.1 |
| 2021/0339681 A1 * | 11/2021 | McNea | B60R 3/02 |

* cited by examiner

*Primary Examiner* — Mong-Shune Chung
(74) *Attorney, Agent, or Firm* — Taft Stettinius & Hollister LLP; Stephen F. Rost

(57) ABSTRACT

Systems and methods utilizing automation logic for powered ladders of work vehicles, including harvesters. A portion of the powered ladder can be displaced relative to other portions of the ladder so that the powered ladder is in either a folded or unfolded orientation. A controller can determine whether a secondary device, such as, for example, a header, is attached to the work vehicle. In response to at least determining the secondary device is not attached to the work vehicle, the folded powered ladder can be automatically displaced from an extended position to a retraced position. Upon detection of either or both a change in position of an operator, and a predetermined operational status of the work vehicle, the ladder can be displaced away from the retracted position, and the second portion of the powered ladder can be displaced so that the powered ladder can return to the unfolded orientation.

20 Claims, 7 Drawing Sheets

AUTOMATED POWERED LADDER

FIELD OF THE DISCLOSURE

The present disclosure generally relates to powered ladders, and, more specifically, to powered ladder automation logic for work vehicles.

BACKGROUND

Work vehicles are configured to perform a wide variety of tasks. For example, work vehicles can be configured to be used as construction vehicles, forestry vehicles, cotton pickers, lawn maintenance vehicles, as well as on-road vehicles such as those used to plow snow, spread salt, or vehicles with towing capability. Additionally, work vehicles can include agricultural vehicles, such as tractors or harvesters, including self-propelled combine-harvesters, among other agricultural vehicles.

Many work vehicles include a cab in which an operator sits or stands while operating the work vehicle. The cab can be supported by a frame of the work vehicle. Further, depending on the size of the frame, the cab can be located at a relatively elevated position with respect to the ground surface. Therefore, in at least some instances, a ladder can be utilized to enable the operator to vertically ascend to a height at which the operator can gain access to the cab or a platform of the work vehicle that is adjacent to the cab.

SUMMARY

The present disclosure may comprise one or more of the following features and combinations thereof.

In one embodiment of the present disclosure, an apparatus can comprise a ladder having a first portion and a second portion, at least one processor, and a memory device that can be coupled with the at least one processor. The memory device can include instructions that when executed by the at least one processor cause the at least one processor to activate, in response to receipt of a fold command, at least one actuator to displace the second portion relative to the first portion to a folded position, and determine whether a secondary device is attached to a work vehicle. Additionally, the memory device can include instructions that when executed by the at least one processor can further cause the at least one processor to activate, at least in response to the secondary device being determined to not be attached to the work vehicle, the at least one actuator to displace the ladder in a first direction.

In another embodiment, a powered ladder assembly for a harvester can comprise a ladder having a first portion and a second portion, and a fold actuator that can be configured to at least vertically displace the second portion relative to the first portion between a folded position and an unfolded position. The powered ladder assembly can also include a swing actuator that can be configured to rotatably displace the first portion and the second portion of the ladder from an extended position to a retracted position, and a speed sensor adapted to detect a speed of travel of the harvester. Additionally, the powered ladder assembly can also include at least one processor, and a memory device coupled with the at least one processor. The memory device can include instructions that when executed by the at least one processor cause the at least one processor to activate, in response to receipt of a fold command, the fold actuator to displace the second portion from the unfolded position to the folded position, and determine whether a header is attached to the harvester. Further, the memory device can include instructions that when executed by the at least one processor can further cause the at least one processor to determine whether the speed of travel of the harvester satisfies a predetermined speed threshold, and activate, in response to the header being determined to not be attached to the harvester and the speed of travel being determined to satisfy the predetermined speed threshold, the swing actuator to rotatably displace the ladder from the extended position to the retracted position.

In a further embodiment of the present disclosure, a method is provided for controlling a displacement of a ladder of a work vehicle. The method can include activating, in response to receipt of a fold command, a fold actuator to displace a second portion of the ladder relative to a first portion of the ladder from an unfolded position to a folded position. The method can also include determining whether a secondary device is attached to the work vehicle, and determining whether a speed of the work vehicle satisfies a predetermined speed threshold. Additionally, the method can include activating, in response to the secondary device being determined to not be attached to the work vehicle and the speed of the work vehicle being determined to satisfy the predetermined speed threshold, a swing actuator to rotatably displace the ladder from an extended position to a retracted position.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
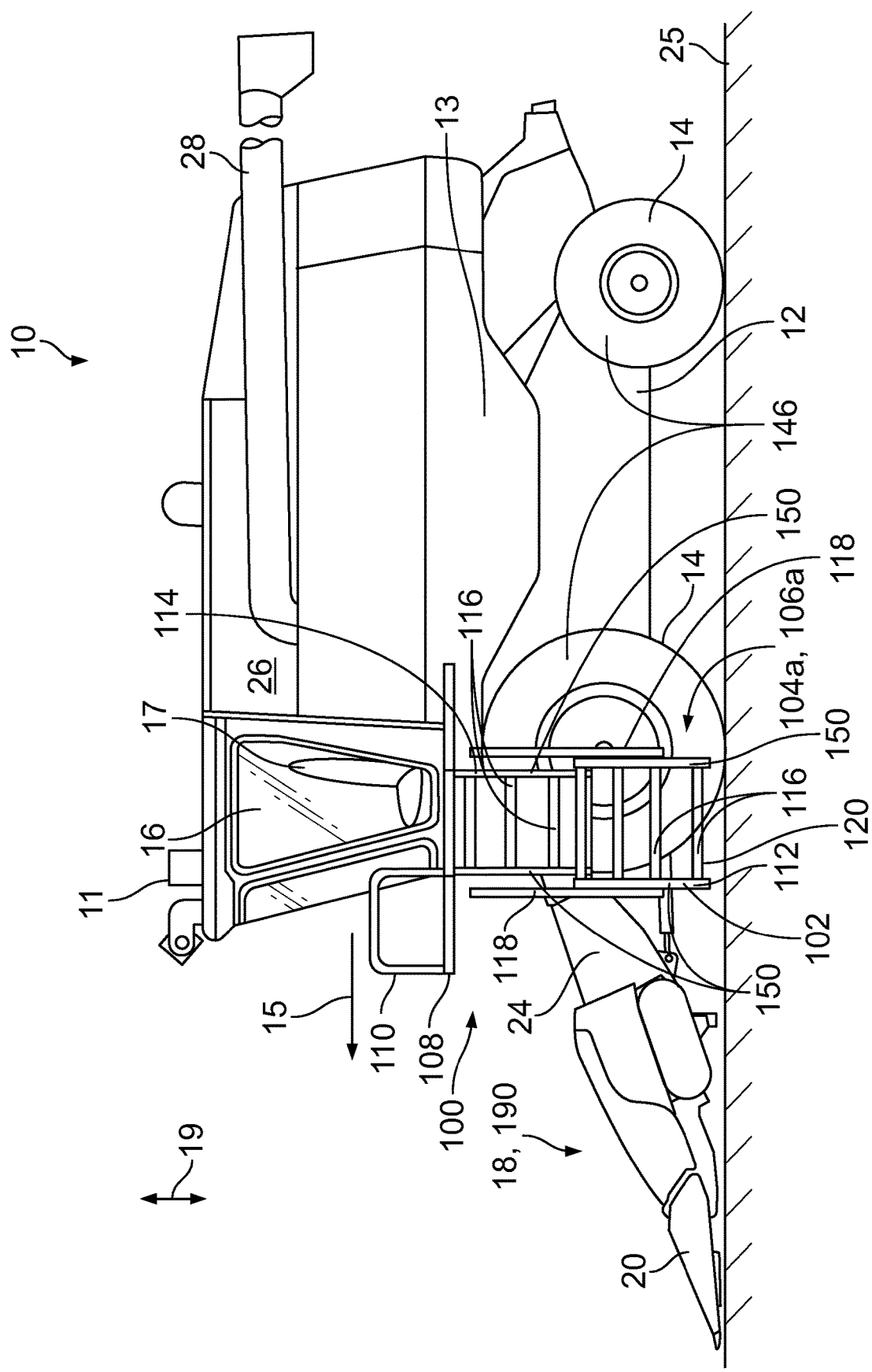
FIG. 1 illustrates an embodiment of an exemplary work vehicle having a powered ladder assembly having a powered ladder that is at an unfolded position and located at an extended position relative to the work vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

FIG. 1 illustrates an embodiment of an exemplary work vehicle 10 having a powered ladder assembly 100 having a powered ladder 102 that is in an unfolded position and at an extended position 106a relative to the work vehicle 10. While the work vehicle 10 illustrated in FIG. 1 and discussed below is a combine harvester, the subject disclosure is applicable to a variety of other types of work vehicles, including agricultural machines, such as, but not limited to, self-propelled forge harvesters and sprayers, among others. Further, while some of the below disclosure provides examples of the work vehicle 10 being utilized in connection with harvesting a particular type of crop, such as corn, the subject disclosure is applicable to a variety of types of agricultural operations involving different types of crops.

As shown in FIG. 1, the illustrated work vehicle 10 can include a chassis 12 and ground engaging mechanisms (e.g., wheels 14) that contact a ground surface 25. The wheels 14 are coupled to the chassis or frame 12, and are used in connection with propulsion of the work vehicle 10 in a forward operating or travelling direction 15. The operation of the work vehicle 10 can be controlled from at least an operator cab 16. The operator cab 16, in some embodiments, includes one or more controls for controlling the operation of the work vehicle 10. The operator cab 16 can include either or both a seat 17 for an operator to sit or an area for the operator to stand while operating the work vehicle 10, including while the work vehicle 10 travels at least in the forward direction 15. The work vehicle 10 can also include a location device, such as, for example, a receiver 11 of a global positioning system (GPS) that can receive signals used in determining location information and/or coordinates.

In the illustrated embodiment in which the work vehicle 10 is a combine harvester, the work vehicle 10 is shown in FIG. 1 as being attached to a selectively removable header 18, which in the illustrated example is a corn header. The exemplary header 18 is disposed at a forward end of the work vehicle 10 and includes a plurality of crop row dividers 20. In the illustrated embodiment, the crop row dividers 20 are configured to direct stalks of the crop, such as corn, into the header 18, and to separate corn ears from the stalks. The corn ears are directed by a crop auger assembly and a slope conveyor 24 toward a guide drum that directs the corn ears to an inlet transition section. The inlet transition section directs the cut crop to an axial harvested crop processing arrangement.

The harvested crop processing arrangement can include a rotor housing and a rotor arranged therein. The rotor includes a hollow drum to which crop processing elements are fastened for a charging section, a threshing section, and a separating section. The charging section is arranged at the front end of the axial harvested crop processing arrangement. A threshing section and a separating section are located downstream in the longitudinal direction and to the rear of the charging section. The drum can be in the form of a truncated cone located in the charging section. The threshing section can include a forward section in the form of a truncated cone and a cylindrical rear section. The cylindrical separating section of the drum is located at the rear or end of the axial harvested crop processing unit. In place of the axial harvested crop processing unit, a tangential threshing drum with a following axial threshing section or a straw chopper can also be used.

Corn and chaff that fall through a thresher basket associated with the threshing section and through a separating grate associated with the separating section may be directed to a cleaning system with a blower and sieves with louvers. The sieves can be oscillated in a fore-and-aft direction. The cleaning system removes the chaff and guides the clean corn over a screw conveyor to an elevator for clean corn. The elevator for clean corn deposits the clean corn in a corn tank 26. The clean corn in the corn tank can be unloaded by means of an unloading screw conveyor 28 to a corn wagon, trailer, or truck. Harvested crop remaining at the lower end of the sieve is again transported to the harvested crop processing arrangement by a screw conveyor and an overhead conveyor. The harvested crop residue delivered at the upper end of the sieve that consists essentially of chaff and small straw particles may be conveyed by means of an oscillating sheet conveyor to a chopper rotor assembly.

The illustrated powered ladder assembly 100 is coupled to the work vehicle 10 to at least assist the operator with vertically ascending from, and descending to, the ground surface 25. Moreover, the powered ladder assembly 100 includes a powered ladder 102 that can be positioned to assist the operator with ascending to a vertical height that can assist with the operator being able to enter into the operator cab 16. The powered ladder assembly 100 can also include one or more platforms 108 and associated handrails 110 that are located above, or around an upper area of the powered ladder 102, and thus are at an elevated position above the ground surface 25. For example, upon ascending up the powered ladder 102, the operator can transition from the powered ladder 102 to a platform 108 of the powered ladder assembly 100 so as to be positioned, or be able to move to a position, to enter into the operator cab 16. According to certain embodiments, the platform 108 can extend along or around portions of the work vehicle 10, including along a portion of the work vehicle that is generally adjacent to an exterior portion of the operator cab 16.

Figure 2:
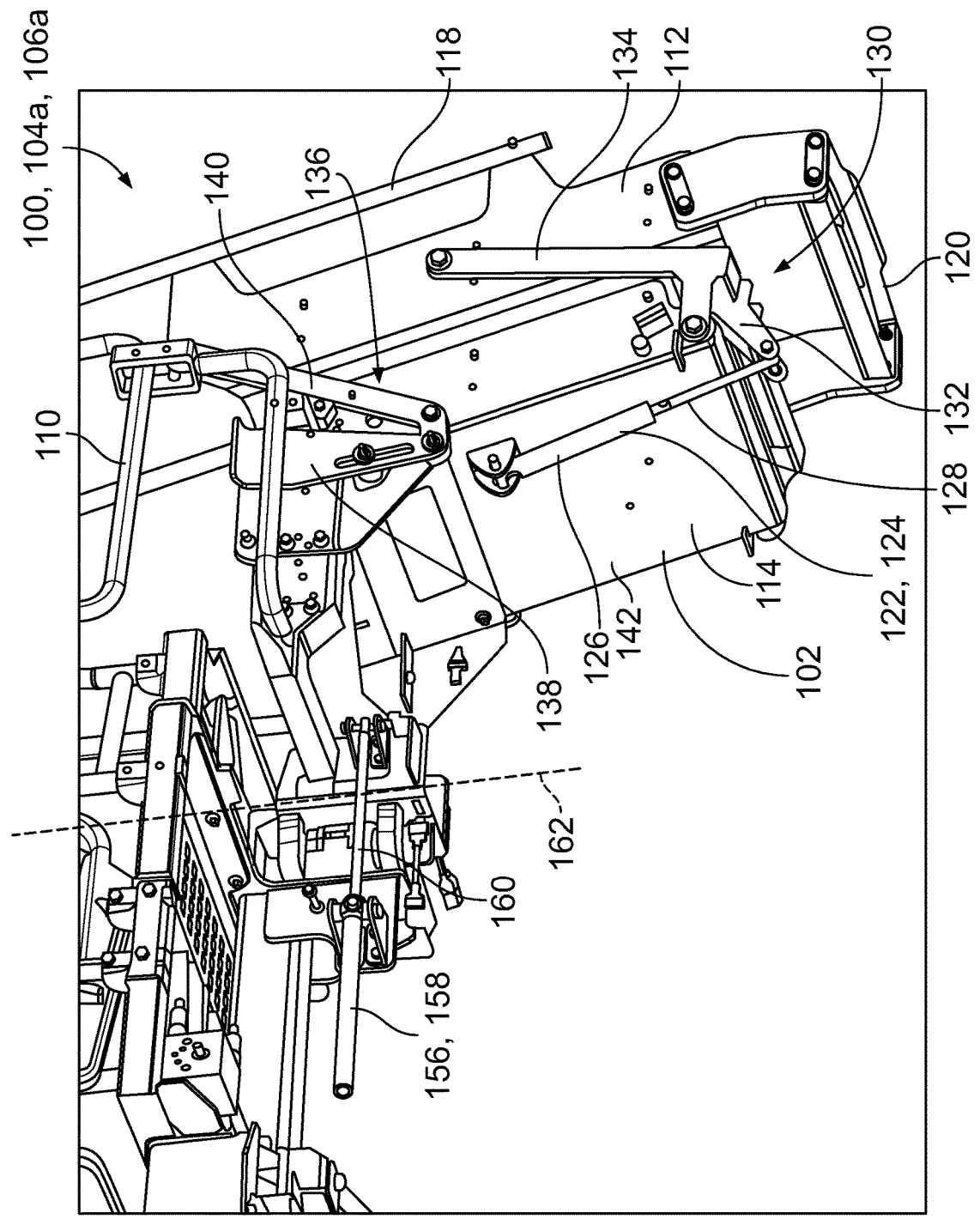
FIG. 2 illustrates a rear side perspective view of the exemplary powered ladder assembly in a folded position.
Figure 3:
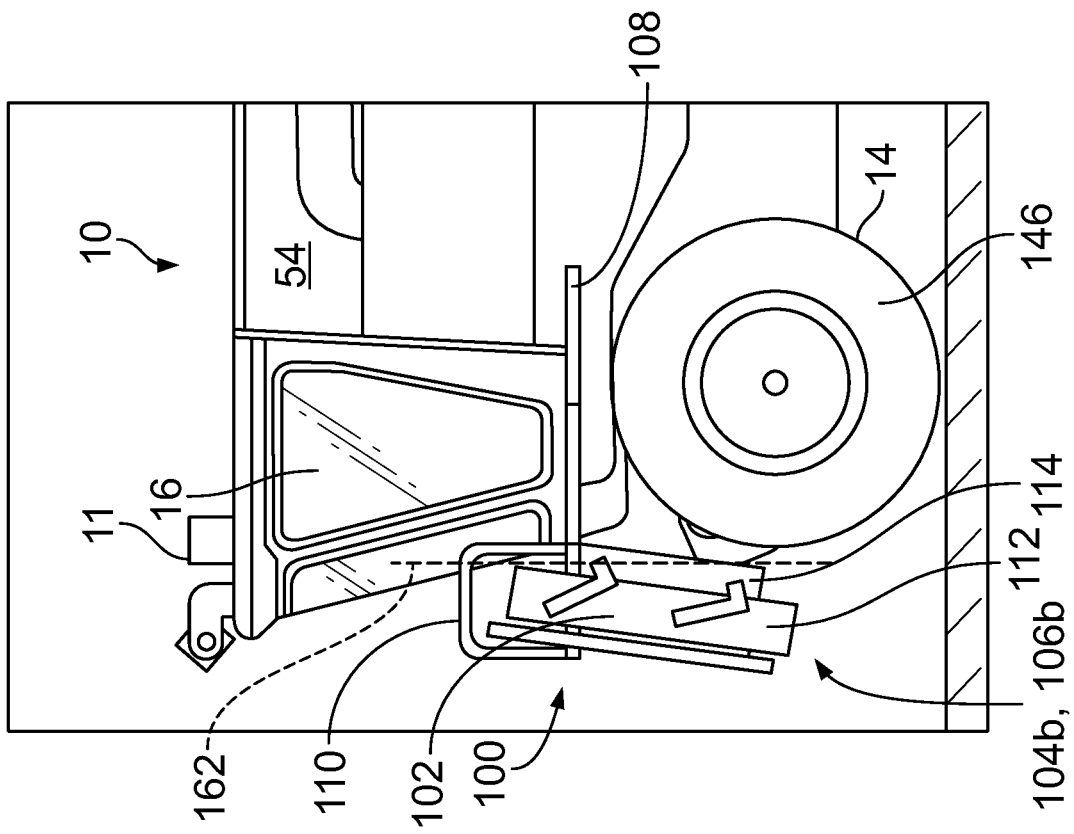
FIG. 3 illustrates a side view of a portion of the exemplary work vehicle and the powered ladder assembly shown in FIG. 1 with the powered ladder assembly in the folded position while at the extended position.
Figure 4:
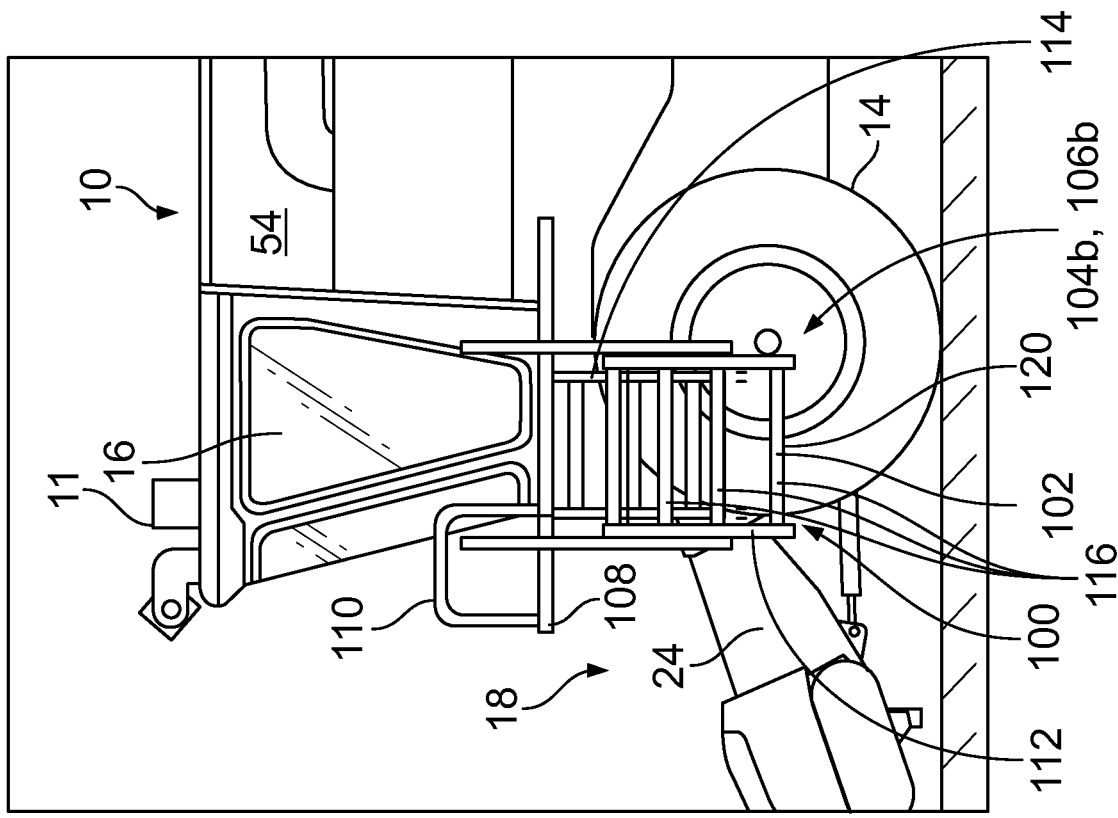
FIG. 4 illustrates a side view of a portion of the exemplary work vehicle and powered ladder assembly shown in FIG. 1 with the powered ladder in the folded position while at a retracted position relative to the work vehicle.

As seen in at least FIGS. 1 and 2, the powered ladder 102 includes a fixed, first or upper portion 112 and an unfixed, second or lower portion 114. According to the illustrated embodiment, the first portion 112 can be at a generally fixed vertical height relative to either or both the second portion 114 of the powered ladder 102 or the platform 108 of the powered ladder assembly 100. The second portion 114 can be displaceable at least in a generally vertical direction 19 relative to the first portion 112 so as to accommodate the second portion 114 being, relative to the first portion 112, being either at a folded position 104a (FIG. 1) or an unfolded position 104b (FIGS. 2-4). The second portion 114 being either in the folded position 104a or the unfolded position 104b can correspond to the ladder 102 being either in a folded orientation or an unfolded orientation, respectively. Each of the first and second portions 112, 114 include one or more steps or rungs 116 onto which the operator can place a foot/feet while at least ascending and descending along the powered ladder 102. One or both of the first and second portions 112, 114 of the powered ladder 102 can also include at least one handrail 118.

As seen in FIG. 1, in the unfolded position 104a, the second portion 114 of the powered ladder 102 can be in relatively close proximity, if not engage, the ground surface 25. Conversely, in the folded position 104b, at least a portion of the second portion 114 of the powered ladder 102 that had been in close proximity to, or engaged with, the ground surface 25 when the powered ladder 102 was in the unfolded position 104a has been raised so as to increase the vertical distance between the second portion 114 and the adjacent ground surface 25. Moreover, the folded position 104b is configured to position at least a lower end 120 of the second portion 114 of the powered ladder 102 at a distance above the ground surface 25 so as to prevent the second portion 114 from engaging the ground surface 25 while the work vehicle 10 is operating in either of the work mode and the transport mode.

According to certain embodiments, the second portion 114 is coupled to the first portion 112 in a manner that can accommodate the second portion 114 being selectively displaced relative to the first portion 114 in at least a vertical direction as the powered ladder 102 changes between the unfolded and folded positions. The powered ladder 102 can be configured to accommodate a variety of different types of displacement of either or both the second portion 114 or the entire powered ladder 102 as the powered ladder 102 is changed from the unfolded and folded orientations, and vice versa. For example, according to certain embodiments, the second portion 114 can be generally linearly displaced relative to the first portion 112 as the powered ladder 102 changes between the unfolded and folded positions 104a, 104b. Additionally, or alternatively, the first and second portions 112, 114 of powered ladder 102 can both be displaced relative to the platform 108 or the operator cab 16 as the powered ladder 102 changes between the unfolded and folded positions orientations.

The powered ladder assembly 100 can include at least one actuator that can be configured to either or both displace the ladder 122 between folded and unfolded orientations or retracted and extended positions. For example, according to the illustrated embodiment, the at least one actuator can be configured to, or include one or more fold actuators 122 that can, provide a force that is used to displace a least a portion of the powered ladder 102 as the powered ladder 102 changes between the unfolded and folded orientations. The fold actuator 122 can be a mechanical, electrical, pneumatic, or hydraulic actuator, as well as combinations thereof. For example, according to certain embodiments, the fold actuator 122 can include a hydraulically actuated fold cylinder 124. According to such an embodiment, one or more coils, pumps, and valves can be utilized to control a pressure within the hydraulically actuated fold cylinder 124, and associated circuit, so that the fold cylinder 124 can be displaced between extended and retracted states.

Referencing FIG. 2, a cylinder housing 126 of the fold cylinder 124 can be mounted to the first portion 112 of the powered ladder 102, including, for example, a rear surface 142 of the first portion 112. The cylinder housing 126 can include an inner chamber that can house at least a portion of the hydraulic fluid, as well as receive selective displacement of a cylinder rod 128 of the fold cylinder 124. According to such an embodiment, a portion of the cylinder rod 128, such as, for example, an end of the cylinder rod 128, can be coupled to a first lower link 132 of a lower fold link assembly 130. The first lower link 132 can also be coupled to a second lower link 134 of lower fold link assembly 130, the second lower link 134 being coupled to the second portion 114 of the powered ladder 102.

According to such an exemplary embodiment, when the powered ladder 102 is to be changed from the folded position orientation (FIG. 3) to the unfolded orientation (FIG. 1), the fold actuator 122 can be operated in a manner that retracts at least a portion of the cylinder rod 128 into an inner chamber of the fold cylinder 124. As the cylinder rod 128 is retracted, the cylinder rod 128 can provide a pulling force against the first lower link 132 that can displace the first lower link 132 in a first direction, such as, for example, a clockwise direction. Such displacement of the first lower link 132 can be transmitted to the second lower link 134 such that the second lower link 134 is displaced, such as, for example, in a generally downward direction. As the second lower link 134 is coupled to the second portion 114 of the powered ladder 102, such displacement of the second lower link 134 can facilitate at least downward displacement of the second portion 114 relative to the first portion 112 of the powered ladder 102. Moreover, such displacement of the second lower link 134 can at least assist in lowering a vertical height of the second portion 114 of the powered ladder 102 at least relative to the first portion 112. Such lowering of the second portion 114 can continue until the second portion 114 reaches the unfolded position 104a, as shown in FIG. 1.

When the exemplary powered ladder 102 is to be changed from the unfolded orientation to the folded orientation, the fold actuator 122 can be operated in a manner that extends at least a portion of the cylinder rod 128 out of, or away from, the inner chamber of the fold cylinder 124. As the cylinder rod is extended, the cylinder rod 128 can provide a pushing force against the first lower link 132 that can displace the first lower link 132 in a second direction, such as, for example, a counterclockwise direction. Such displacement of the first lower link 132 can be transmitted to the second lower link 134 such that the second lower link 134 is displaced at least in a generally upward direction. As the second lower link 134 is coupled to the second portion 114 of the powered ladder 102, such displacement of the second lower link 134 can facilitate at least upward displacement of the second portion 114 relative to the first portion 112 of the powered ladder 102. Moreover, such displacement of the second lower link 134 can at least assist in increasing a vertical height of the second portion 114 of the powered ladder 102 at least relative to the first portion 112. Such raising of the second portion 114 can continue until the second portion 114 reaches the folded position 104b, as shown in at least FIG. 3.

Figure 7:
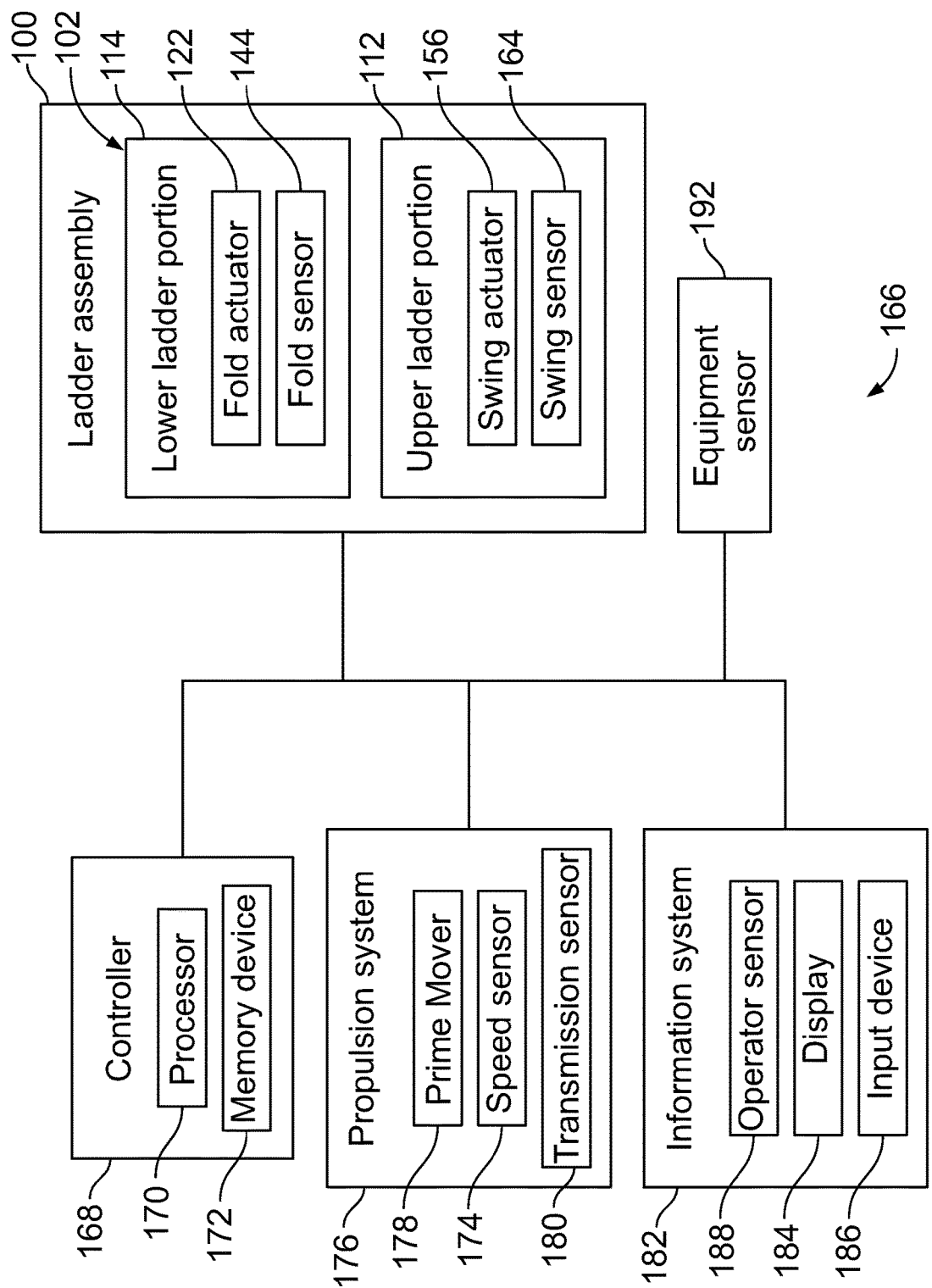
FIG. 7 illustrates an exemplary block diagram of an example powered ladder system for a work vehicle.

As also seen in at least FIG. 2, according to certain embodiments, the powered ladder assembly 100 can include an upper fold link assembly 136 having a first upper link 138 and a second upper link 140 that are at least rotably coupled to each other. The first upper link 138 can also be coupled to either or both the first portion 112 of the powered ladder 102 or the platform 108 of the powered ladder assembly 100, while the second upper link 140 is also be coupled to the second portion 114 of the powered ladder 102. As seen in FIG. 2, according to the illustrated embodiment, the upper fold link assembly 136 is coupled to the first and second portions 112, 114 of the powered ladder 102 at positions that are vertically higher than the locations at which the lower fold link assembly 130 is coupled to the first and second portions 112, 114 of the powered ladder 102. The upper fold link assembly 136 can assist with guiding the movement of the second portion 114 of the powered ladder 102 as the second portion 114 is displaced via operation of the fold actuator 122. Additionally, according to certain embodiments, the upper fold link assembly 136 can be configured to limit the extent the second portion 114 can be displaced relative to the first portion 112. For example, with respect to one or both of the folded position 104b and the unfolded position 104a, the upper fold link assembly 136 can be configured to function as a stopper. For example, according to certain embodiments, the upper fold link assembly 136 can be configured to limit the vertical height to which the second portion 114 can be raised when the powered ladder 102 is displaced to the folded orientation. Additionally, or alternatively, according to certain embodiments, the upper fold link assembly 136 can be configured to limit the vertical height to which the second portion 114 can be lowered when the second portion 114 of the powered ladder 102 is displaced to the unfolded position 104a. Additionally, according to certain embodiments, the vertical position of the second portion 114 of the powered ladder 102 in either, or both, the unfolded and folded positions 104a, 104b can be controlled, as well as detected, using information provided by one or more fold sensors 144 (FIG. 7).

In addition to at least a portion of the powered ladder 102 being is displaceable as the powered ladder 102 transitions between the unfolded and folded orientations, the powered ladder 102 is also rotatable. Moreover, at least the first and second portions 112, 114 of the powered ladder 102 are rotatable such that the powered ladder 102 can move, or swing, relative to at least the work vehicle 10 between an extended position 106a, as shown in FIGS. 1 and 5, and a retracted position 106b, as shown, for example, in FIGS. 4 and 6.

Figure 5:
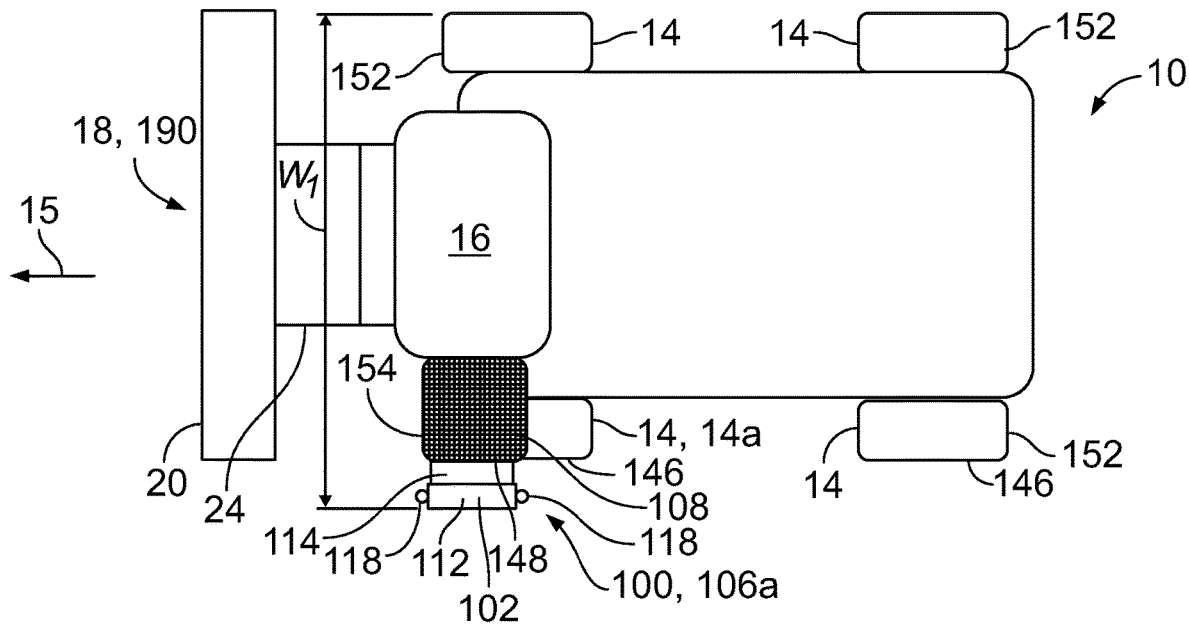
FIG. 5 illustrates a top side view of a simplified representation of a work vehicle in the form of a harvester coupled to a header, and with the powered ladder at the extended position.

More specifically, FIGS. 1 and 5 depict the exemplary powered ladder 102 at an extended position 106a relative to the work vehicle 10, which in this example is a harvester. In the illustrated embodiment, at the extended position 106a, the powered ladder 102 is generally adjacent to a sidewall 146 of a front wheel 14a (FIG. 5), a sidewall 13 of the frame 12, or a first sidewall 148 of the platform 108. According to the exemplary embodiment shown in FIG. 1, in the extended position 106a, the steps or rungs 116 of the first or second portions 112, 114 of the powered ladder 102 can extend between opposing rails 150 of the powered ladder 102 in a direction that can be generally parallel to the sidewall 146 of the wheel 14 or the travelling direction 15. Similarly, the first sidewall 148 of the platform 108 to which the powered ladder 102 is generally adjacent can extend in a first direction that is generally parallel to the direction of travel 15. The extended position 106a can, with the powered ladder 102 in the unfolded orientation, be configured to facilitate the operator with entering into the operator cab 16. As shown by at least FIG. 5, with the powered ladder 102 at the extended position 106a, the powered ladder 102 can contribute to, or increase, the overall width (as generally indicated by "$w_1$" in FIG. 5) of the work vehicle 10.

The inclusion of a ladder 102 with a work vehicle 10 can result in an increase in a size, such as a width, of the work vehicle 10. Such an increase in the size of the work vehicle 10 may be of minimal concern when the work vehicle 10 is operating in a work mode. For example, with respect to work vehicles 10 that are harvesters, when in the work mode, the harvester may be harvesting a crop in a generally open field. In such situations, there may be minimal opportunities for the work vehicle 10 to come into close proximity with other vehicles, structures, or barriers. However, the work vehicle 10 can also be operated in a transport mode, including, for example, while traveling along a road or moving to or from a field. Accordingly, compared to the work mode, the work vehicle 10 can have more opportunities to come into relatively close proximity to other vehicles, structures, and barriers while in the transport mode. Thus, the size of the work vehicle 10, including the contribution of a ladder 102 to a width of the work vehicle 10, at least when the work vehicle 10 is in the transport mode can be of concern As shown by at least FIGS. 4 and 6, displacing, such as, for example, rotating or swinging, the ladder 102 to the retracted position 106b can result in the powered ladder 102 being at a position that reduces, or minimizes the contribution of the powered ladder 102 to, the width of the work vehicle 10, if not reduce the overall width of the work vehicle 10. For example, referencing the exemplary embodiment shown in FIGS. 4 and 6, the retracted position 106b can, relative to the extended position 106a, be a generally inward position at which the powered ladder 102 is positioned adjacent to a tread surface 152 of the adjacent wheel 14, the tread surface 152 being generally perpendicular to the sidewall 146 of the wheel 14. Additionally, at the retracted position 106b, the powered ladder 102 can be adjacent to a second sidewall 154 of the platform 108, the first and second sidewalls 148, 154 of the platform 108 extending in different directions. According to certain embodiments, the second sidewall 154 can generally extend in a direction that is generally perpendicular to the direction at which the first sidewall 148 of the platform 108 extends. Additionally, according to certain embodiments, when moved to the retracted position 106b, at least a portion of the powered ladder 102, including at least a portion of the first portion 112 of the powered ladder 102, can be moved to a position at which that portion of the powered ladder 102 becomes at least partially covered by the platform 108, as seen by a comparison of FIGS. 5 and 6.

Further, according to certain embodiments, the steps or rungs 116 of the first and second portions 112, 114 of the powered ladder 102 can, when the powered ladder 102 is at the retracted position 106b, extend between opposing rails 150 of the powered ladder 102 in a direction that is different than the direction at which the steps or rungs 116 extend when the powered ladder 102 is at the extended position 106a. Moreover, at the retracted position 106b, the steps or rungs 116 can extend between opposing rails 150 of the powered ladder 102 in a direction that is, for example, acute or generally perpendicular to the direction of travel 15.

Figure 6:
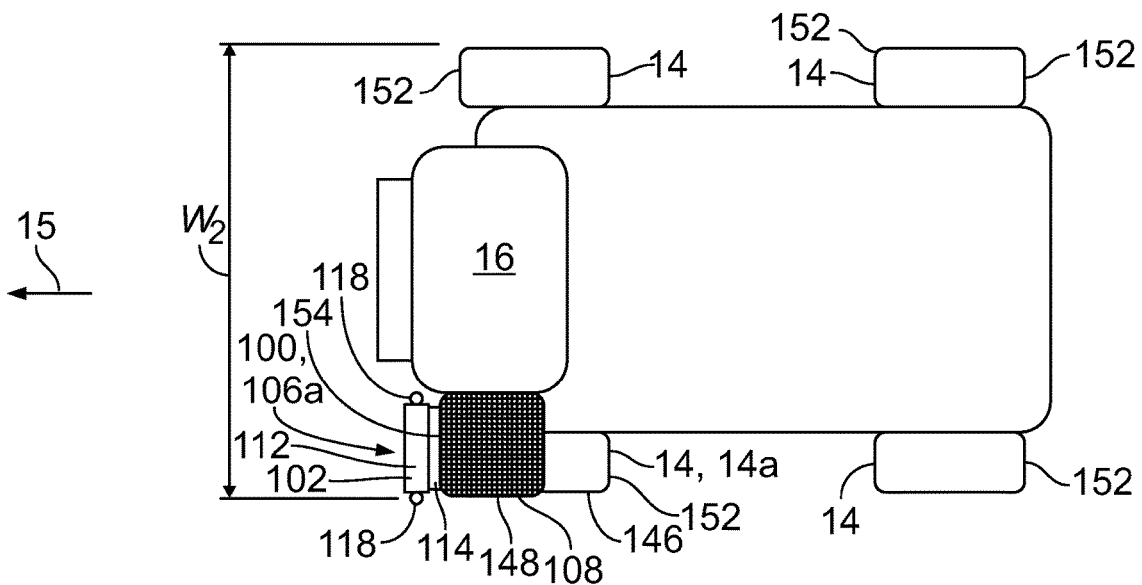
FIG. 6 illustrates the representation of the harvester shown in FIG. 5 but without being coupled to the header and with the powered ladder at the retracted position.

Thus, with the powered ladder 102 at the retracted position 106b, the work vehicle 10 can have a second width (as generally indicated in FIG. 6 by "$w_2$") that is smaller than the first width ("$w_1$") discussed above for the work vehicle 10 when the powered ladder 102 is at the extended position 106a. Additionally, while FIGS. 4 and 6 illustrate the powered ladder 102 being at a position upstream, or in front, of a front wheel 14a when at the retracted position 106b, the powered ladder 102 can be positioned at other locations when at the retracted position 106b, including positioned downstream of the front wheel 14a, among other locations.

The powered ladder 102 can be displaced, including rotated or swung, between the extended position 106a and the retracted position 106b in a variety of manners. For example, the at least one actuator of the powered ladder assembly 100 can be configured to, or include one or more swing actuators 156 that can, provide a force used to displace the powered ladder 102 as the powered ladder 102 moves from the extended position 106a to the retracted position 106b, and vice versa. In the illustrated embodiment, the at least one actuator includes a swing actuator 156 that can be a mechanical, electrical, pneumatic, or hydraulic actuator, as well as combinations thereof. For example, according to certain embodiments, the swing actuator 156 can include a hydraulically actuated swing cylinder 158. According to such an embodiment, one or more coils, pumps, and valves can be utilized to control a pressure within the hydraulically actuated swing cylinder 158 and the associated circuit so that a cylinder rod 160 of the swing cylinder 158 can displaced between extended and retracted states. According to certain embodiments, the pump utilized for swing cylinder 158 can be the same pump that is utilized for the fold cylinder 124, with one or more valves being used to control the delivery of hydraulic fluids to the fold and swing cylinders 124, 158.

Referencing FIG. 2, according to an exemplary embodiment, a first end of the swing cylinder 158 can be coupled to the platform 108, while another portion of the swing cylinder 158, such as, for example, the cylinder rod 160 of the swing cylinder 158, is coupled to the powered ladder 102, such as, for example the first portion 112 of the powered ladder 102. According to such an embodiment, the powered ladder 102 can be pivotally coupled to the platform 108 such that the powered ladder 102 can be rotated or swung relative to the platform about a swing axis 162. The swing axis 162 can generally extend in a vertical direction. Further, according to certain embodiments, the swing axis 162 can extend in a direction that can be generally perpendicular to the ground surface 25.

Hydraulic fluid, and associated pressure, in an inner chamber of a cylinder housing of the swing cylinder 158 can be utilized to displace the cylinder rod 160 of the swing cylinder 158 between extended and retracted positions. According to certain embodiments, outward extension of the cylinder rod 160 of the swing cylinder 158 can provide a force that can rotate the powered ladder 102 about the swing axis 162 from the retracted position 106b to the extended position 106a. Conversely, the swing cylinder 158 can be operated to retract at least a portion of the cylinder rod 160 into the inner chamber of the swing cylinder 158. In such a situation, the retraction of the cylinder rod 160 of the swing cylinder 158 can facilitate a pulling force being exerted on the powered ladder 102 that can displace, or rotate, the powered ladder 102 about the swing axis 162 from the extended position 106a to the retracted position 106b. Additionally, according to certain embodiments, the rotational displacement of the powered ladder 102 to either, or both, the extended positon 106a and the retracted positions 106b can be controlled, as well as detected, using information provided by one or more swing sensors 164 (FIG. 7).

FIG. 7 illustrates an exemplary block diagram of an example powered ladder system 166 for a work vehicle 10. The powered ladder system 166 can include a controller 168 having one or more processors 170 that can follow instructions, including control instructions, contained with, or are part of, one or more memory devices 172, including, for example, a non-transitory machine-readable medium. The exemplary embodiment shown in FIG. 7 illustrates the controller 168 as being separate from at least the powered ladder system 166. For example, the controller 168 can be part of engine control unit, or used with in connection with one or more systems of the work vehicle 10 in addition to the powered ladder system 166. However, according to other embodiments, the powered ladder system 166 can have a dedicated controller that is at least similar to the controller 168 that is herein illustrated and discussed.

According to certain embodiments, the memory device 172 can include instructions that when executed by the processor 170 cause the processor 170 to generate signals that can facilitate control of the powered ladder system 166, including activation and deactivation of the fold actuator 122 and the swing actuator 156. Moreover, the processor 170 can generate signals that can facilitate the displacement of the second portion 114 of the powered ladder 102 between the unfolded and folded positions 104a, 104b, as well as displacement of the powered ladder 102 between the extended and retracted positions 106a, 106b. As discussed below, the timing at which the processor 170 generates signal for at least activation or deactivation of operation of the fold actuator 122 or swing actuator 156 can also be based on a variety of criteria, including, but not limited to, information provided by the operator, the speed at which the work vehicle 10 is traveling, an operation status of the work vehicle 10, a determination of which equipment is, or is not, coupled to the work vehicle, or information from the fold sensor 144 or swing sensor 164, as well as combinations thereof, among other information.

The powered ladder system 166 can include, or utilize information provided by, a speed sensor 174 that may, or may not be part of a propulsion system 176 of the work vehicle 10. The propulsion system 176 can either or both include or control a prime mover 178, such as, for example, an engine, that generates power used for propulsion of the work vehicle 10. The speed sensor 174 can be configured to detect, or provide information used to determine, a speed or rate of travel at which the work vehicle 10 is currently traveling. Additionally, or alternatively, the speed sensor 174 can provide information indicating, or used to determine, whether the current rate of travel of the work vehicle 10 has, or has not exceed, a predetermined threshold, or, alternatively, has dropped below a predetermined threshold.

The propulsion system 176 can also be configured to provide information to the controller 168 that can indicate when the work vehicle 10, including a transmission of the work vehicle 10 is, or is not, in a parked position. For example, according to certain embodiments, the propulsion system 176 can include a transmission sensor 180, such as, for example, a transmission position sensor or transmission range sensor, that can indicate an operational status, or change of operational status, of the work vehicle 10. For example, according to certain embodiments, the change in operational status can relate to the work vehicle 10 being placed in park. Thus, according to certain embodiments, the operational status, or change in operations status, can be detected via determination of a position, or change in position, of a gear selector or shifter that is coupled to a transmission of the work vehicle 10. The gear selector or shifter can be operated, including, for example, displaced, by the operator. Thus, for example, the transmission sensor 180 can be configured to provide information as to when the operator has operated, including, for example, shifted the gear selector, and thus the associated transmission, from a drive position or setting to a park position or setting, as well as indicate when the gear selector, and thus transmission, is in the park position or setting. However, an indication of the work vehicle 10 being parked can be provided in a variety of other manners, including via other systems of the work vehicle 10, including, but not limited to, a braking system, among other systems or components of the work vehicle 10. For example, the controller 168 may determine the work vehicle 10 is parked based on an indication that a parking brake of the work vehicle 10 is in an engaged position.

The work vehicle 10 can also include an input/output system, also referred to herein as an information system, 182 having one or more input/output devices that can be utilized in connection with at least the powered ladder assembly 100. For example, the information system 182 can include a display 184, such as, for example, a monitor, screen, or touch screen, as well as any combination thereof, among other types of displays. The information system 182 can also include an input device 186 that the operator can engage or manipulate to enter a command relating to the operation of the powered ladder assembly 100. A variety of types of devices can be utilized for the input device 186, including, but not limited to, a switch, button, joystick, mouse, keyboard, or touchscreen, among other input devices.

The information system 182 can also include an operator sensor 188 that is configured to either, or both, detect a position or change of position of the operator within the operator cab 16. For example, according to certain embodiments, the operator sensor 188 can be a force sensor that is positioned in the seat 17 in the operator cab 16. According to such an embodiment, a force, or change of force, detected from information provided by the operator sensor 188 can provide information, such as, for example, to the controller 168, as to whether the operator is, or is not, sitting in the seat 17, or whether the operator has changed from a seated position in the seat 17 to a standing position off of the seat 17, and vice versa. Additionally, or alternatively, one or more operator sensors 188 can be positioned in the operator cab 16 that can indicate if the operator is, or is not, standing. For example, the operator sensor 188 can include one or more force sensors that can be positioned on, or in, a floor of the operator cab 16. In such embodiments, the force detected, or anticipated to be detected by the operator sensor 188 when the operator is standing, as opposed to the force detected, or anticipated to be detected, when the operator is sitting in the seat 17, can provide an indication of whether the operator is, or is not standing or seated in the operator cab 16. Such operator sensors 199 can also be positioned to provide an indication of where in the operator cab 16 the operator is, or was standing, which can also provide an indication of operator movement, or other changes in the position of the operator within or about, the operator cab 16. Additionally, or alternatively, the operator sensor 188 can comprise one or more infrared sensors, including photo-eye sensors, that can provide an indication of whether an operator is, or is not, standing or sitting in the operator cab 16. While the foregoing provide some examples of sensors that can be utilized as the operator sensor 188, a variety of other types of sensors can be utilized to detect a position, as well as changes thereto, of the operator in the operator cab 16.

The work vehicle 10, including the controller 168, can also be configured to detect, or otherwise sense, when certain equipment, referred to herein as secondary device or equipment 190, is, or is not, attached to the work vehicle 10. Such detection can be attained in a variety of different manners. For example, the controller 168 can be configured to detect an electrical or hydraulic connection, or input of supply of electrical power, to certain secondary device 190, such as, for example, a header 18, which can indicate a current attachment between the work vehicle 10 and the secondary device 190. Thus, the absence of such an electrical or hydraulic connection, or supply of electrical power or hydraulic fluids, among other connections, can provide an indication to the controller 168 that the secondary device 190 is currently not attached to the work vehicle 10. Additionally, or alternatively, one or more sensors, switches, or optical devices such as, but not limited to cameras, (collectively referred to as an equipment sensor 192) can be utilized to provide an indication to at least the controller 168 as to whether such secondary device 190 is, or is not, currently attached to the work vehicle 10. As discussed below, the absence or presence of an indication of a current attachment of certain secondary device 190, or types of secondary device 190, to the work vehicle 10 can impact whether the powered ladder 102 does, or does not, automatically swing from the extended position 106a to the retracted position 106b. For example, with respect to work vehicles 10 that are harvesters, the determination by the controller 168 as to whether the header 18 is, or is not, currently attached to the work vehicle 10 can impact whether the powered ladder 102 can be displaced to the retracted position 106b. Further, as indicated by such an example, the detected secondary device 190 may be equipment other than the equipment or components of the powered ladder 102 or powered ladder assembly 100.

Figure 8:
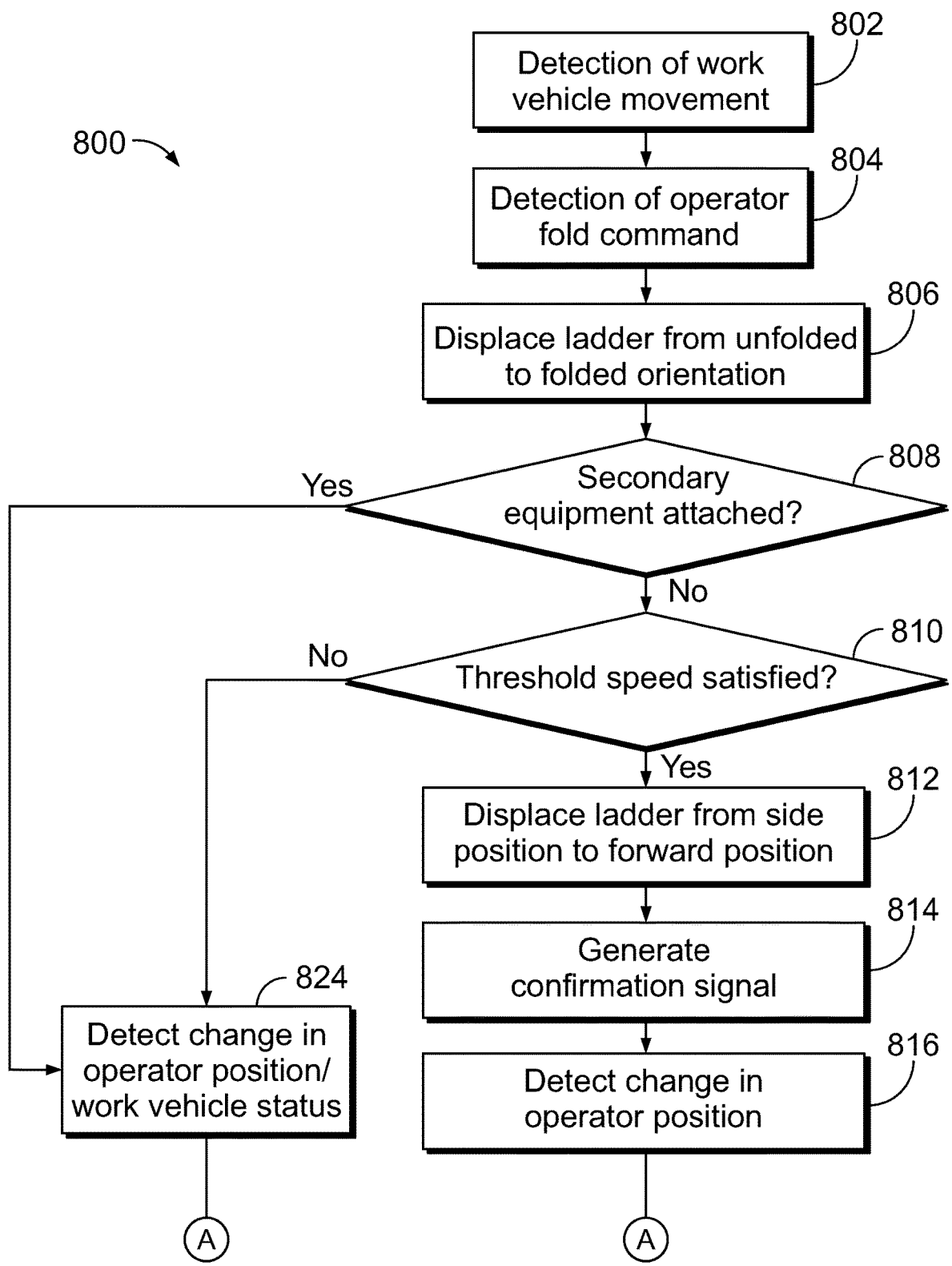
FIG. 8 illustrates a simplified flow chart of an example method that can be performed using at least the controller shown in FIG. 7 for controlling automatic displacement of the powered ladder assembly between folded and unfolded positions and the extended and retracted positions.
Figure 8:
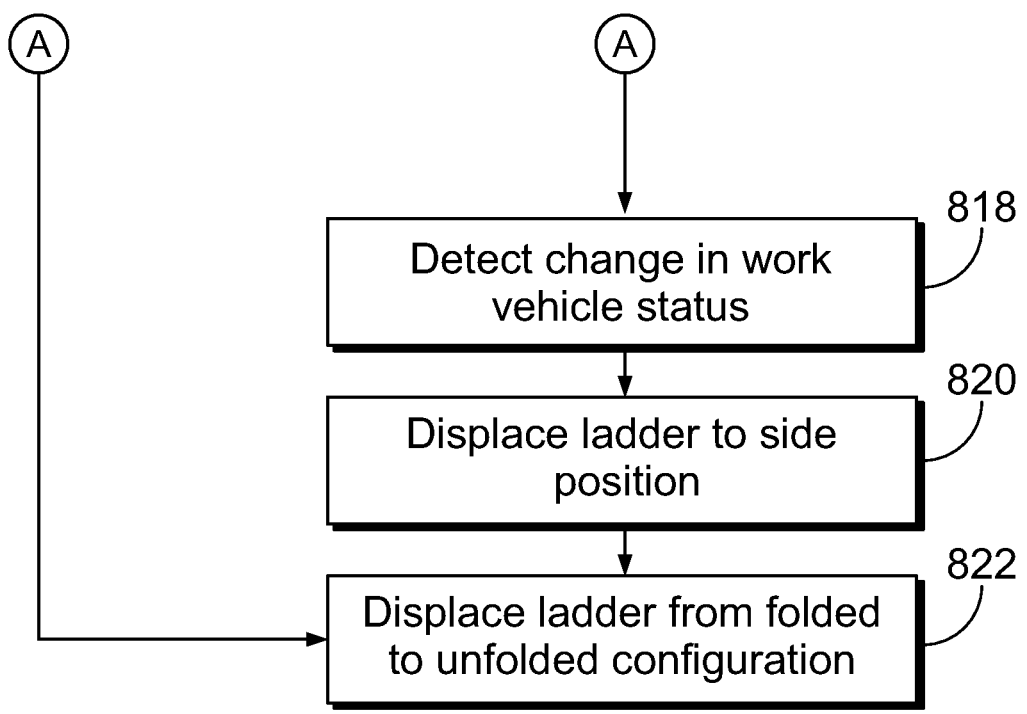

FIG. 8 illustrates a simplified flow diagram of an exemplary method 800 for operating the illustrated example powered ladder assembly 100. The method 800 is described below in the context of being carried out by the illustrated exemplary powered ladder system 166. However, it should be appreciated that method 800 can likewise be carried out by any of the other described implementations, as well as variations thereof. Further, the method 800 corresponds to, or is otherwise associated with, performance of the blocks described below in the illustrative sequence of FIG. 8. It should be appreciated, however, that the method 800 can be performed in one or more sequences different from the illustrative sequence. Additionally, one or more of the blocks mentioned below may not be performed, and the method can include steps or processes other than those discussed below.

At block 802, the controller 168 can detect movement of the work vehicle 10. The detection of movement of the work vehicle 10 can be attained in a variety of manners, including, but not limited to, via the controller 168 utilizing information provided by the propulsion system 176, including, for example, by the speed sensor 174. At block 804, the controller 168 can receive a signal providing an indication that the operator is seeking to have the powered ladder 102 changed from at least the unfolded orientation to the folded orientation. For example, according to certain embodiments, before or during movement of the work vehicle 10, the operator can utilize the input device 186 to provide an operator command or other indication that the operator is seeking to have the powered ladder 102 at least be in the folded orientation.

At block 806, in response to the detection of the operator fold command, the controller 168 can be utilized to fold the powered ladder 102. For example, as previously discussed, utilizing instructions provided by the memory device 172, the processor 170 can generate a signal to facilitate activation or operation of the fold actuator 122 in a manner that can displace the second portion 114 of the powered ladder 102 relative to the first portion 112 such that the powered ladder 102 is placed in the folded orientation. According to certain embodiments, before generating a signal to activate the fold actuator 122, the controller 168 can confirm that the powered ladder 102 is currently in the unfolded orientation. For example, the controller 168 can utilize information provided by the fold sensor 144 to confirm whether the powered ladder 102 is, or is not, in the unfolded orientation. Further, according to certain embodiments, following activation of the fold actuator 122, the controller 168 can receive information from the from the fold sensor 144 indicating the powered ladder 102 is, or has been placed into, the folded position orientation. The controller 168 can then generate a signal for the information system 182 to notify the operator that the powered ladder 102 is in the folded orientation. For example, either or both a visual indicator of the powered ladder 102 being in the folded orientation can be displayed on the display 184 or an audible alert can be provide via use of a speaker in the operator cab 16.

Additionally, in connection with at least the operator providing a command indicating the powered ladder 102 is to be in the folded orientation, the controller 168 can determine at block 808 whether one or more pieces of secondary device 190, or a particular type of secondary device 190, are/is currently attached to the work vehicle 10. For example, with respect to embodiments in which the work vehicle 10 is a harvester, at block 808 the controller 168, including the processor 170 of to the controller 168, can determine whether the header 18 is, or is not, attached to the harvester. As mentioned above with respect to at least FIG. 7, determination of whether the secondary device 190 is, or is not, attached, to the work vehicle 10 can be attained in a variety of different manners, including, but not limited to, via detection of an electrical connection between the work vehicle 10 and the secondary device 190, or via use of an equipment sensor 192, as well as combinations thereof, among other manners of detection.

If a determination is made at block 808 that one or more pieces of the secondary device 190, or a particular piece or type of secondary device 190, are/is not attached to the work vehicle 10, then at block 810 a determination can be made as to whether the work vehicle 10 is traveling at a speed that satisfies, or exceeds, a predetermined speed threshold. According to certain embodiments, the predetermined speed threshold can be used as an indicator as to whether the work vehicle 10 is being operated in the transport mode or the work mode. As discussed above, operation in the transport mode can be associated with speeds of the work vehicle 10 that are higher than the speeds at which the work vehicle 10 travels when in the work mode. Thus, for example, the predetermined speed threshold can provide an indication as to whether the work vehicle 10 is, or will be, travelling along a road, among other terrains or locations. Whether the work vehicle 10 is, or is not, traveling at a speed that satisfies or exceeds the predetermined speed threshold can be determined by the controller 168, including via use of the processor 170, in a variety of manners, including, but not limited to, via use of information provided by the speed sensor 174.

If determinations are made that the secondary device 190 is not attached to the work vehicle 10, and that the work vehicle 10 is traveling at a speed that satisfies or exceeds the predetermined threshold speed, then, at block 812, the powered ladder 102 can be displaced from the extended position 106a to the retracted position 106b. Thus, according to the illustrated embodiment, the fold command provided by the operator, as discussed above with respect to block 804, may, in addition to facilitating a folding of the powered ladder 102 to the folded orientation, also, if certain criteria are satisfied, also result in an automatic displacement of the folded powered ladder 102 from the extended position 106a to the retracted position 106b. As previously discussed, displacement of the powered ladder 102 to the retraced position 106b, including rotation or swinging of the folded powered ladder 102 about the swing axis 162, can be attained in a variety of manners. For example, according to certain embodiment, at block 812, the processor 170 of the controller 168 can generate a signal to activate operation of the swing actuator 156 so as to provide a force that facilitates displacement of the powered ladder 102 to the retracted position 106b.

According to certain embodiments, the swing sensor 164 can provide a signal or information indicating when the powered ladder 102 is in, or has reached, the retracted position 106b. In response to receipt of a signal from the swing sensor 164 indicating the powered ladder 102 is at, or has reached, the retracted position 106b, the controller 168 can, at block 814, generate a signal for the information system 182 to notify the operator of the position of the powered ladder 102. For example, at block 814, the controller 168 can generate a signal for the information system 182 to provide a notification to the operator that the powered ladder 102 is in the retracted position 106b, or is in the folded orientation at the retracted position 106b. For example, the information system 182 can provide either or both a visual indication on the display 184, or communicate an audible alert via use of a speaker in the operator cab 16, as well as a combination thereof, that the powered ladder 102 is at the retracted position 106b, or is in the folded orientation at the retracted position 106b.

According to certain embodiments, as indicated by block 816, the powered ladder 102 can remain at the retracted position 106b, and in the folded orientation, until at least a detection of a movement or change in position of the operator. For example, as discussed above with respect to FIG. 7, one or more operator sensors 188 can be utilized to indicate whether the operator is, or is not, sitting in the seat 17; indicate the operator has moved from sitting in the seat 17 to a standing position; or, there has been a change in the position or location at which the operator is standing in the operator cab 16, as well as combinations thereof, among other operator positions or positional changes.

Additionally, according to certain embodiments, at block 818, the controller 168 can be provided with information that can be used to determine whether the work vehicle 10 has a particular operational status, such as, for example, whether the work vehicle 10 is parked, or in the parked condition. For example, the work vehicle 10 or propulsion system 176 can include one or more sensors, such as, for example a transmission, or transmission position, sensor 180, among other components or systems of the work vehicle 10, that can provide an indication of a change in an operational status of the work vehicle 10, such as, for, example, when the work vehicle 10 has been parked. In response to an indication of either, or both, a particular operational status of the work vehicle 10 (such as being parked) and the change in position or location of the operator in the operator cab 16, the controller 168, including the processor 170, can at block 820 generate a signal to activate operation of the swing actuator 156. In such a situation, the swing actuator 156 can be activated so as to provide a force to facilitate displacement of the powered ladder 102 from the retracted position 106b to the extended position 106a.

Additionally, at block 822, the controller 168, including the processor 170, can also generate a signal to facilitate activation of the fold actuator 122 so that the powered ladder 102 changes, or is unfolded, from the folded orientation to the unfolded orientation. Activation of the fold actuator 122, and thus the unfolding of the powered ladder 102, can occur at a variety of times relative to the powered ladder 102 being displaced to the extended position 106a, as discussed with respect to block 820. For example, according to certain embodiments, the fold actuator 122 can be activated after the swing sensor 164 has communicated to the controller 168 that the powered ladder 102 has reached the extended position 106a, or after deactivation of the swing actuator 156. Alternatively, according to other embodiments, the fold actuator 122 can be activated within a predetermined time period after activation of the swing actuator 156. According to another embodiment, activation of the fold actuator 122 at block 822 can coincide with the activation of the swing actuator 156 at block 822. With each embodiment, the displacement of the powered ladder to the extended position 106a, as well as the unfolding of the powered ladder 102 to the unfolded orientation, can occur without specific or dedicated instructions or commands from the operator. Instead, with respect to the operator, such displacement of the powered ladder 102 to the extended position 106a and unfolded orientation can automatically occur. Thus, aside from providing a command to fold the powered ladder 102 at block 804, the displacement of the folded powered ladder 102 to the retracted position 106b, as well as the later displacement of the ladder to the extended position 106a and associated unfolding of the powered ladder 102 to the orientation can generally be automatic, and moreover, occur without additional specific ladder commands from the operator. Such automatic operations of the powered ladder 102 can improve the ease with which the operator can operate the work vehicle 10, and allow the operator to focus on other operations involving the work vehicle 10.

Returning to block 808, if the controller 168 determines the secondary device 190 is attached to the work vehicle 10, then, by default, the powered ladder 102 may not be automatically displaced from the extended position 106a to the retracted position 106b. Moreover, in such a situation, the powered ladder 102 can remain in the folded orientation at the extended position 106a until a detection of either or both a change in the position or location of the operator in the work vehicle 10 or a change in the operational status of the work vehicle 10 is detected at block 824. Such detection of changes in operator positon/location and the status of work vehicle 10 at block 824 can be at least be similar, if not identical, to the features discussed above with respect to block 818. Thus, the above discussion regarding block 818 is also applicable to block 824. Upon detection of either or both a change in operator positon/location or work vehicle 10 operational status, the method 800 can proceed to block 822, wherein the fold actuator can be activated to unfolded the powered ladder 102 so that the powered ladder 102 is in the unfolded orientation.

Returning to block 810, in the event the controller 168 determines the predetermined speed threshold is not satisfied or exceeded, the powered ladder 102 can remain at the extended position 106a. Moreover, not satisfying or exceeding the predetermined speed threshold can provide an indication that the work vehicle 10 may be being operated in a work mode, and thus displacement of the powered ladder 102 to the retracted position 106b may be unwarranted or deemed unnecessary. Accordingly, the method 800 can then proceed to block 824, wherein a detection of a change in either or both operator positon/location or the operational status of work vehicle 10 can initiate an unfolding of the powered ladder 102 at block 822.

According to certain embodiments, the powered ladder system 166 can also be configured to accommodate the folded powered ladder 102 being displaced to the retracted position 106b regardless of whether the secondary device 190 is, or is not, attached to the work vehicle 10. According to such an embodiment, the controller 168, including the processor 170, can determine whether a signal has been received by the controller 168 indicating the operator has issued an override command for the powered ladder 102. The operator can communicate the override command in a variety of manners, including, for example, via use of the input device 186, among other devices of the information system 182. If a determination is made that an override command has been received, the controller 168 can generate a signal used to seek conformation from the operator that the operator is seeking to displace the powered ladder 102 to the retracted position 106b. For example, the controller 168 can generate a signal that facilitates a request for confirmation from the operator being shown on the display 184, or through another device of the information system 182. In response to the controller 168 determining the operator has confirmed the override command, the powered ladder 102 can be displaced to the retracted position 106b.

According to certain embodiments in which the override command(s) has/have been used to swing the powered ladder 122 to the retracted position 106b, the powered ladder system 166 can remain at the retracted position 106b until the operator issues another command to swing the ladder back to the extended position 106a. Alternatively, or additionally, the powered ladder system 166 can be configured to automatically swing the powered ladder back to the extended position 106a, as well as displace the folded powered ladder 122 to the unfolded configuration. Moreover, similar to blocks 816, 818, and 824 of the method 800 discussed above, in such a situation, the powered ladder 102 can, in response to the override command(s), remain in the folded orientation at the extended position 106*a* until a detection of either or both a change in the position or location of the operator in the work vehicle 10 or a change in the operational status of the work vehicle 10. Upon detection of either or both a change in operator positon/location or work vehicle 10 operational status, the swing actuator 156 can be activated to swing the powered ladder 102 to the extended position 106*a*, and the fold actuator 122 can be activated to unfolded the powered ladder 102 so that the powered ladder 102 is in the unfolded orientation.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An apparatus comprising:
    a ladder including a first portion and a second portion;
    at least one processor; and
    a memory device coupled with the at least one processor, the memory device including instructions that when executed by the at least one processor cause the at least one processor to:
        activate, in response to receipt of a fold command, at least one actuator to displace the second portion relative to the first portion to a folded position;
        determine whether a secondary device is attached to a work vehicle; and
        activate, at least in response to the secondary device being determined to not be attached to the work vehicle, the at least one actuator to displace the ladder in a first direction.

2. The apparatus of claim 1, wherein the activation of the at least one actuator to displace the ladder in the first direction is further in response to a speed of the work vehicle being determined to satisfy a predetermined speed threshold.

3. The apparatus of claim 1, wherein the memory device includes instructions that when executed by the at least one processor further cause the at least one processor to:
    determine a change in a position of an operator of the work vehicle;
    determine an operational status of the work vehicle; and
    activate, in response to the determined change in the position of the operator and the determined operational status, the at least one actuator to displace the ladder in a second direction, the first direction being opposite of the second direction.

4. The apparatus of claim 3, wherein the memory device includes instructions that when executed by the at least one processor further cause the at least one processor to:
    activate, in response to the determined change in the position of the operator and the determined operational status, the at least one actuator to displace the second portion of the ladder from the folded position to an unfolded position.

5. The apparatus of claim 3, wherein the work vehicle is a harvester, the secondary device is a header for the harvester, the operation status is an indication the harvester is parked, the at least one actuator comprises a fold actuator and a swing actuator, and the first and second directions are rotational directions, and
    wherein the memory device includes instructions that when executed by the at least one processor further cause the at least one processor to activate, in response to a receipt of at least an override command when the secondary device is attached to the work vehicle, the swing actuator to displace the ladder in the first direction.

6. The apparatus of claim 1, wherein the memory device includes instructions that when executed by the at least one processor further cause the at least one processor to:
    receive the fold command generated by an input device in an operator cab of the work vehicle, and
    wherein the at least one actuator is activated to displace the ladder in the first direction without a receipt of another command from the input device after receipt of the fold command.

7. The apparatus of claim 1, wherein the memory device includes instructions that when executed by the at least one processor further cause the at least one processor to generate a signal to at least communicate to an information system that the ladder has been displaced in the first direction to a retracted position.

8. A powered ladder assembly for a harvester comprising:
    a ladder having a first portion and a second portion;
    a fold actuator configured to at least vertically displace the second portion relative to the first portion between a folded position and an unfolded position;
    a swing actuator configured to rotatably displace the first portion and the second portion of the ladder from an extended position to a retracted position;
    a speed sensor adapted to detect a speed of travel of the harvester;
    at least one processor; and
    a memory device coupled with the at least one processor, the memory device including instructions that when executed by the at least one processor cause the at least one processor to:
        activate, in response to receipt of a fold command, the fold actuator to displace the second portion from the unfolded position to the folded position;
        determine whether a header is attached to the harvester;
        determine whether the speed of travel of the harvester satisfies a predetermined speed threshold; and
        activate, in response to the header being determined to not be attached to the harvester and the speed of travel being determined to satisfy the predetermined speed threshold, the swing actuator to rotatably displace the ladder from the extended position to the retracted position.

9. The powered ladder assembly of claim 8, further including at least one operator sensor, and wherein the memory device includes instructions that when executed by the at least one processor further cause the at least one processor to determine, using at least information provided by the at least one operator sensor, a change in a position of an operator of the harvester.

10. The powered ladder assembly of claim 9, wherein the memory device includes instructions that when executed by the at least one processor further cause the at least one processor to determine whether the harvester is in a parked state.

11. The powered ladder assembly of claim 10, wherein the memory device includes instructions that when executed by the at least one processor further cause the at least one processor to activate, in response to the determined change in the position of the operator and the harvester being determined to be in the parked state, the swing actuator to rotatably displace the ladder from the retracted position to the extended position.

12. The powered ladder assembly of claim 8, wherein the memory device includes instructions that when executed by the at least one processor further cause the at least one processor to activate, response to a receipt of at least an override command when the header is attached to the harvester, the swing actuator to displace the ladder to the retracted position.

13. The powered ladder assembly of claim 8, wherein the memory device includes instructions that when executed by the at least one processor further cause the at least one processor to:
- receive the fold command generated by an input device in an operator cab of the harvester, and
- wherein the swing actuator is activated without receipt of another command from the input device after receipt of the fold command.

14. The powered ladder assembly of claim 8, wherein the memory device includes instructions that when executed by the at least one processor further cause the at least one processor to generate a signal to at least communicate to an information system that the ladder has been rotatably displaced to the retracted position.

15. A method for controlling a displacement of a ladder of a work vehicle, the method comprising:
- activating, in response to receipt of a fold command, a fold actuator to displace a second portion of the ladder relative to a first portion of the ladder from an unfolded position to a folded position;
- determining whether a secondary device is attached to the work vehicle;
- determining whether a speed of the work vehicle satisfies a predetermined speed threshold; and
- activating, in response to the secondary device being determined to not be attached to the work vehicle and the speed of the work vehicle being determined to satisfy the predetermined speed threshold, a swing actuator to rotatably displace the ladder from an extended position to a retracted position.

16. The method of claim 15, further comprising:
- determining a change in a position of an operator of the work vehicle;
- determining an operational status of the work vehicle; and
- activating, in response to the determined change in the position of the operator and the determined operational status, the swing actuator to displace the ladder from the retracted position to the extended position.

17. The method of claim 16, further including activating, in response to the determined change in the position of the operator and the determined operational status, the fold actuator to displace the second portion of the ladder from the folded position to the unfolded position.

18. The method of claim 15, further including activating, in response to at least a receipt of an override command when the secondary device is attached to the work vehicle, the swing actuator to displace the ladder to the retracted position.

19. The method of claim 15, further including generating a signal to at least communicate to an information system that the ladder has been displaced to the retracted position.

20. The method of claim 15, wherein the work vehicle is a harvester, and wherein the secondary device is a header.

* * * * *